April 23, 1929.  R. H. CHILTON  1,709,829
SPRING SHACKLE
Filed Oct. 15, 1926

Inventor
Ralph H. Chilton
By Spencer Hardman & Fehr
Attorney

Patented Apr. 23, 1929.

1,709,829

UNITED STATES PATENT OFFICE.

RALPH H. CHILTON, OF DAYTON, OHIO, ASSIGNOR TO THE INLAND MANUFACTURING COMPANY, OF DAYTON, OHIO, A CORPORATION OF DELAWARE.

SPRING SHACKLE.

Application filed October 15, 1926. Serial No. 141,788.

This invention relates to coupling members, especially such as may be used as spring shackles on vehicles.

An object of this invention is to provide an improved form of coupling member containing flexible rubber, which avoids the necessity of lubrication and other disadvantages of ordinary metal shackles.

A more specific object is to provide a coupling member of molded rubber and fabric composition wherein fabric layers extend through at least a portion of the soft rubber material to reinforce the soft rubber without at the same time materially limiting the desired distortion thereof. In other words, the reinforcing fabric layers extend through the soft rubber in such direction as to minimize any undesired distortion of said soft rubber but without restricting the desired distortion thereof.

Further objects and advantages of the present invention will be apparent from the following description, reference being had to the accompanying drawings, wherein a preferred form of embodiment of the present invention is clearly shown.

In the drawings.

Similar reference characters refer to similar parts throughout the several views.

Figure 1:
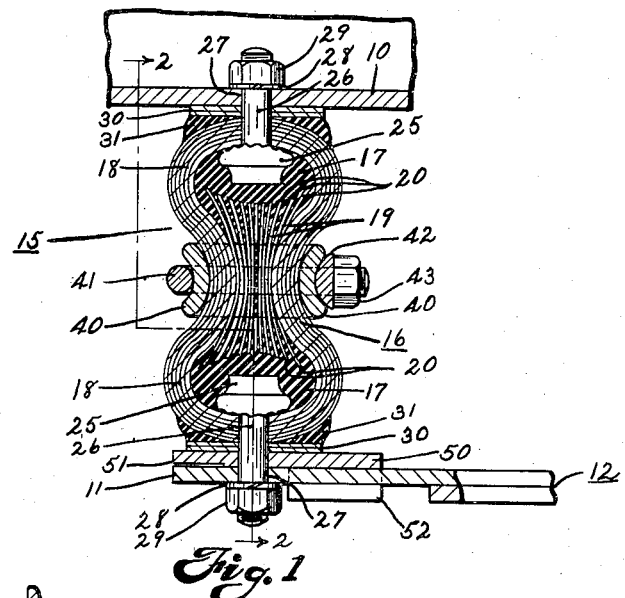
Fig. 1 illustrates a shackle built according to this invention mounted on the rear end of the front spring of an automobile chassis. The vertical section is taken on line 1—1 of Fig. 2.
Figure 2:
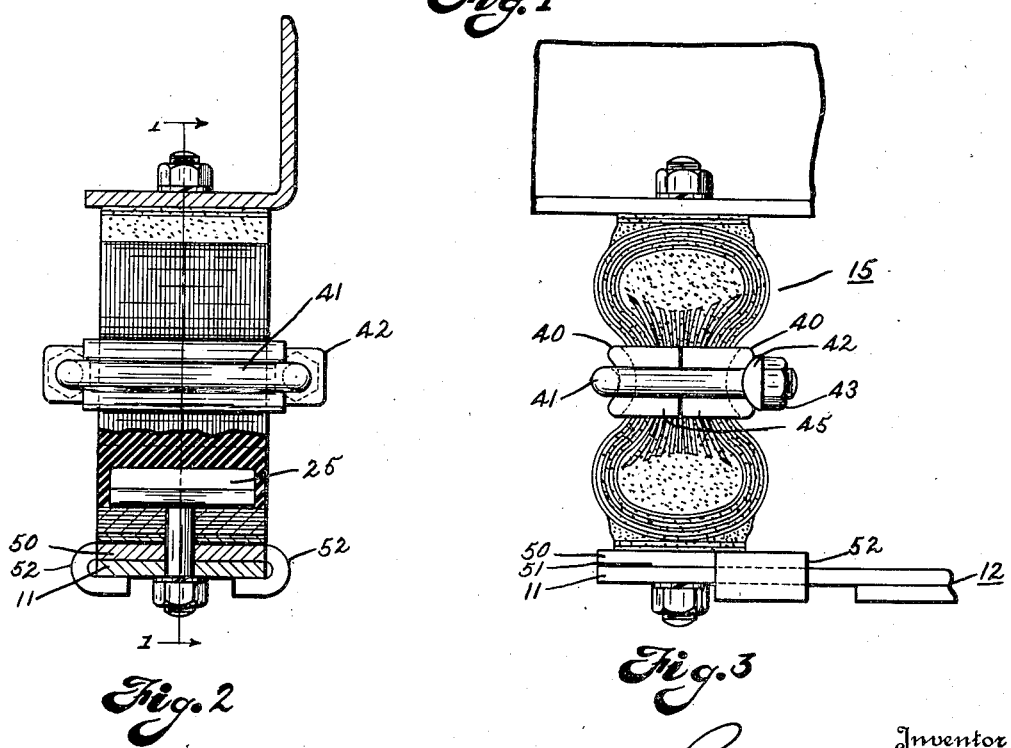
Fig. 2 is in part an end elevation and in part a sectional view taken on line 2—2 of Fig. 1.

Numerals 10 and 11 designate the two relatively movable parts connected by the shackle, 10 being the chassis side rail or a fitting rigidly connected thereto and 11 the projecting end of the longest leaf of the spring 12. The molded unit, indicated as a whole by 15, comprising an endless rubberized fabric band 16 which preferably is composed of a plurality of turns of cord fabric wrapped with the non-extensible cords thereof extending in a peripheral direction. This fabric band 16 is molded substantially in the form of a dumbbell, as clearly shown in Fig. 1, with flexible oval-shaped loops 18 at the ends thereof filled with soft rubber material 17. At the neck portion of this dumb-bell unit a number of extra layers 19 of rubberized fabric are inserted to materially stiffen and strengthen said neck portion against buckling or otherwise distorting when under load. The ends 20 of the fabric layers 19 preferably extend out into the soft rubber 17 where they are flared out and molded in separated relation within the soft rubber 17. The molded in metal inserts 25 have shanks 26, threaded or otherwise rigidly fixed thereto, projecting outwardly through the fabric band 16 as clearly illustrated. At the ends of the flexible loops 18 the relatively stiff rubberized fabric seats 30 are molded in place and the wedge-shaped spaces between the seats 30 and the loops 18 are filled with soft rubber 31.

Figure 3:
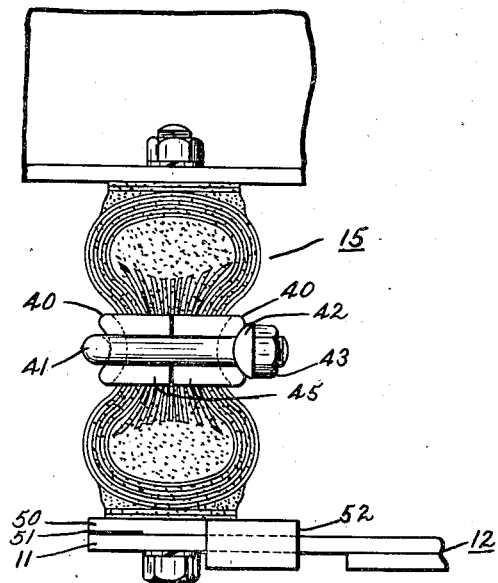
Fig. 3 is a side elevation of Fig. 1.

After this molded unit 15, made as above described, is removed from the mold, the two metal clamps 40 are applied to the neck portion thereof and the U-bolt 41 and cross member 42 applied to very firmly clamp all the fabric members together. The clamps 40 preferably have end flanges 45 extending around the lateral sides of unit 15 to more completely house this neck portion, as clearly shown in Fig. 3, however the clamping pressure obtained by tightening nuts 43 of U-bolt 40 should be taken by the fabric members of the neck portion and not by the ends of flanges 45.

In order to assemble this shackle in place between the parts 10 and 11, the upper shank 26 is inserted through a hole 27 in part 10 and the lock washer 28 and nut 29 applied to the projecting threaded end of shank 22. It will be obvious that by setting up nut 29 very tight the upper end of the flexible loop 18 will be held substantially fixed to part 10. The lower end of the shackle is similarly clamped to the projecting end 11 of the spring leaf 12. In order to strengthen the pierced end of the leaf 11 and also to enable the molded element 15 to have a greater lateral width than leaf 11, if desired, the end of leaf 11 is provided with a seat plate 50 of the desired width. Preferably plate 50 is cut away on its under side as shown at 51 so that no bearing pressure comes on the outer tip of leaf 11. This reduces the bending moment on the leaf 11 at the section thereof weakened by the hole 27, as will be obvious. Preferably plate 50 has the downwardly turned lugs 52 which extend around on the under side of leaf 11, as clearly illustrated, and prevent any tilting of plate 50 due to the cut away portion 51. Lugs 52 also prevent any possible twisting of plate 50 about the shank 26.

In operation, the relatively rigid central portion of unit 15 swings angularly to permit the desired longitudinal movement of the spring end 11. The end loops 18 and the soft rubber blocks 17 are sufficiently flexible to permit the required pivoting of unit 15 at each end thereof by internal distortion. The soft rubber 31 serves to yieldably cushion the flexible loops 18 upon the seats 30 and to prevent mud, dirt, gravel, etc., from entering the wedge-shaped spaces occupied by this rubber 31. The fabric layers 19 greatly strengthen and stiffen the unit 15 at the central portion thereof. The flared ends 20 which extend up into the rubber blocks 17 minimize the lateral bulging of these rubber blocks due to compressive loads but do not hinder the above-mentioned pivotal movement of the flexible ends of unit 15.

While the form of embodiment of the present invention as herein disclosed, constitutes a preferred form, it is to be understood that other forms might be adopted, all coming within the scope of the claims which follow.

What is claimed is as follows:

1. In combination, an extension shackle connecting two relatively movable members, said shackle comprising a swinging element having flexible end portions connected respectively to said members, said end portions each comprising a loop of rubberized fabric enclosing a block of flexible rubber, and a central portion having extra layers of rubberized fabric molded therein.

2. An extension shackle connecting two relatively movable members and having a molded rubber and fabric swinging element comprising: an endless rubberized fabric band molded substantially in the form of a dumb-bell and having flexible rubber blocks contained within the end loops thereof, and extra layers of fabric inserted at the neck portion of said molded element to increase the thickness of said neck portion.

3. An extension shackle connecting two relatively movable members and having a molded rubber and fabric swinging element comprising: an endless rubberized fabric band molded substantially in the form of a dumb-bell and having flexible rubber blocks contained within the end loops thereof, and extra layers of fabric inserted at the neck portion of said molded element, said fabric layers having end portions projecting in spaced relation within the flexible rubber blocks.

4. An extension shackle connecting two relatively movable members and having a molded rubber and fabric swinging element comprising: an endless rubberized fabric band molded substantially in the form of a dumb-bell and having flexible rubber blocks contained within the end loops thereof, and reinforcing fabric layers molded in spaced relation within said flexible rubber blocks.

5. An extension shackle connecting two relatively movable members and having a molded rubber and fabric swinging element comprising: an endless rubberized fabric band molded substantially in the form of a dumb-bell and having flexible rubber blocks contained within the end loops thereof, and reinforcing fabric layers extending substantially transversely within said rubber blocks whereby lateral flow of said rubber blocks when under compression is minimized.

6. An extension shackle connecting two relatively movable members and having a molded rubber and fabric swinging element comprising: an endless rubberized fabric band molded substantially in the form of a dumb-bell and having flexible rubber blocks contained within the end loops thereof, and a reinforcing fabric web extending substantially transversely within said rubber blocks, said web being non-extensible in the transverse direction, whereby lateral flow of said rubber blocks when under compression is minimized.

7. An extension shackle connecting two relatively movable members and having a molded rubber and fabric swinging element comprising: an endless rubberized fabric band molded substantially in the form of a dumb-bell and having flexible rubber blocks contained within the end loops thereof, and a U-bolt surrounding and confining under pressure the neck portion of said molded element.

In testimony whereof I hereto affix my signature.

RALPH H. CHILTON.